April 29, 1969     P. J. GOOD     3,441,186

INTERMITTENT FILM ADVANCEMENT APPARATUS

Filed Jan. 9, 1967

United States Patent Office 3,441,186
Patented Apr. 29, 1969

3,441,186
INTERMITTENT FILM ADVANCEMENT APPARATUS
Paul J. Good, Springwater, N.Y., assignor to Minnesota Mining and Manufacturing Company, St. Paul, Minn., a corporation of Delaware
Filed Jan. 9, 1967, Ser. No. 608,112
Int. Cl. G03b 1/22
U.S. Cl. 226—62                                             5 Claims

ABSTRACT OF THE DISCLOSURE

A rake member for advancing perforated motion picture film has a toothed portion for engaging the perforations in the film. The toothed portion is spring urged obliquely, both in a direction away from the thickness of the film, and in the longitudinal direction in which it is desired to advance the film. A compound cam engages the rake member and, against the force of the oblique spring, moves the member first in a longitudinal direction while the toothed portion is out of contact with the film, then moves the toothed portion into contact with the film to engage the perforations thereof and allows the spring to move the toothed portion longitudinally forwardly while remaining engaged in the perforations, and finally allows the oblique spring to move the toothed portion out of contact with the film so the cycle may be repeated.

---

This invention relates to ways and means for intermittently moving perforated tape along a predetermined path.

Perforated tape as used herein refers to tape which has longitudinally linearly and regularly positioned perforations. It includes photographic film tape which commonly is called movie film and which is referred to herein merely as film.

As is well known, in most movie projectors film from a film supply reel is moved intermittently past a projection gate and thereafter substantially continuously wound up on a take-up reel. At the projection gate, the film is advanced frame by frame. A frame is brought into image projection position at the projection gate, there is a momentary pause in the travel of the film, and then the film is quickly moved so as to bring the next frame into image projection position.

The mechanism for accomplishing this is referred to as a claw mechanism. It comprises a rake member which has a projection that seats in a perforation of the film in the region of the projection gate, thrusts or pulls the film along a predetermined linear path for a distance substantially equal to the longitudinal dimension of a frame, unseats from the perforation and then returns to repeat the operation. In addition to the rake member the apparatus comprises a continuously rotating drive member and means for converting the continuous rotary motion into the type of motion necessary to operate the rake member.

A general object of this invention is to provide a generally improved and more satisfactory intermittent advancement apparatus for film or the like.

A particular object of this invention is to provide an intermittent film advancement apparatus with generally improved and more satisfactory means for converting rotary motion into the motion needed to operate the rake member.

These and other desirable objects may be attained in the manner disclosed as an illustrative embodiment of the invention in the following description and in the accompanying drawings forming a part hereof, in which.

Figure 1:
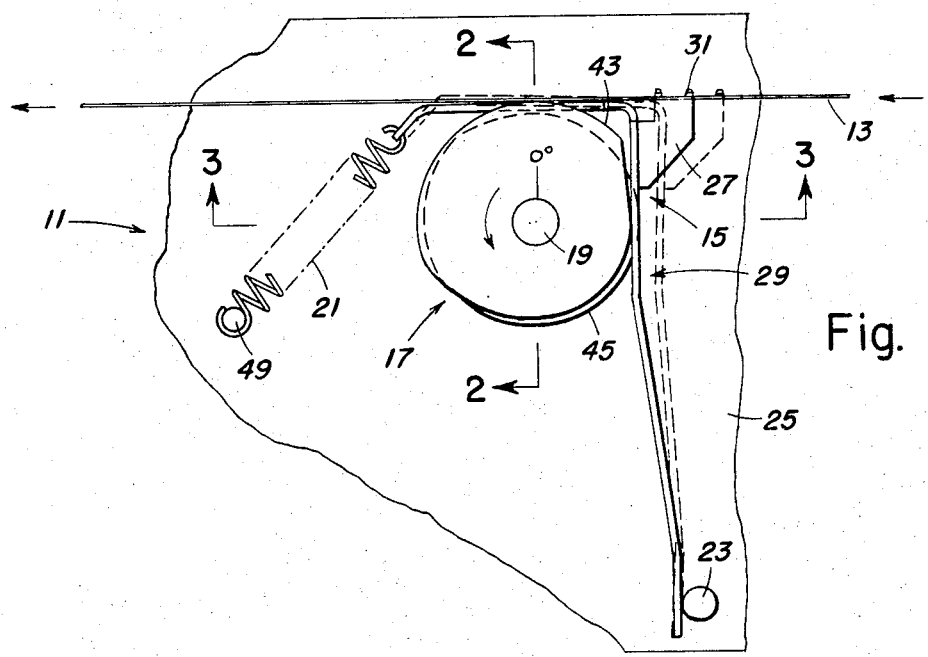
FIG. 1 is a plan view of a preferred specific embodiment of an intermittent film advancement apparatus of this invention, which view shows the relative positions of the various parts of the apparatus at the end of a cycle of operation.
Figure 8:
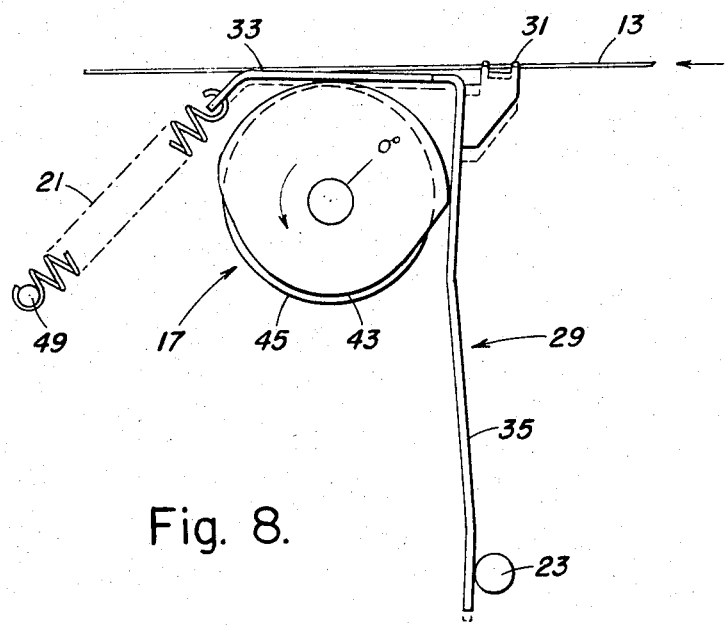
Figure 9:
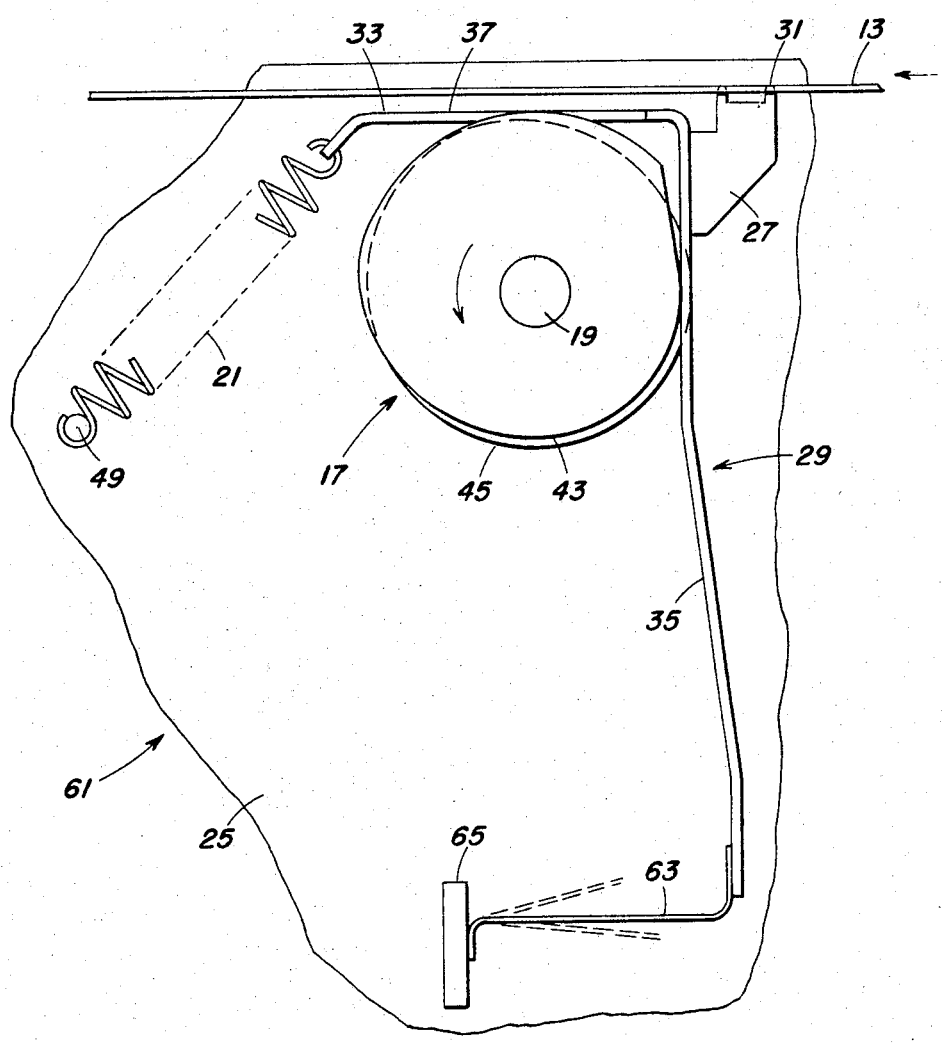

FIG. 8 is yet another plan view of the apparatus of FIG. 1 showing the relative positions of the parts after completion of about seven-eighths of the cycle of operation and just prior to advancement of the film; and FIG. 9 is a plan view of another preferred specific embodiment of an intermittent film advancement apparatus of this invention, which view shows the relative positions of various parts of the apparatus at the conclusion of a cycle of operation.

The drawings disclose two embodiments of an apparatus for advancing intermittently a perforated tape along a predetermined linear path. The plane of this path is hereinafter referred to as the reference plane.

The apparatus, broadly considered, comprises (A) perforated tape rake means having at least one projection insertable into a tape perforation and transversely disposed relative to the reference plane, and (B) cam follower means secured to said rake means. The cam follower means comprise first leg means and second leg means. The first leg means provide a first cam follower surface disposed in a plane generally parallel to the reference plane, while the second leg means furnish a second cam follower surface disposed in a plane generally transverse relative to the plane of the cam follower surface of the first leg means as well as to the reference plane.

The apparatus, broadly considered, comprises, furthermore, (C) radial cam means and (D) means for establishing and maintaining the cam follower means in cam following contact with the radial cam means.

The radical cam means provide a first radial cam surface and a second radial cam surface. The axis of rotation of each radical cam surface is generally parallel to the reference plane. The first cam follower surface of the first leg means abuts the first radial cam surface, while the second cam follower surface of the second leg means abuts the second radial cam surface. A purpose of the first radial cam surface and first leg means is to impart to the cam follower means linear motion transversely to the reference plane so that the projection on the rake means can be inserted into and completely withdrawn from a tape perforation at the proper times in a cycle of operation of the apparatus. A purpose of the second radial cam surface and second leg means is to impart to the cam follower means linear motion generally parallel to the reference plane so that the rake means can be moved back and forth parallel to the predetermined path of the tape with the movement in the direction of the tape travel, at least when the tape is film, being substantially more rapid than the movement opposite to the direction of tape travel.

To achieve the desired linear motion transversely to the reference plane, the radius of the first radial cam surface, starting at the radius at the start of its cycle of operation, the 0° radius, and proceeding oppositely or counter to the normal direction of rotation of the first radial cam surface, decreases to a minimum, preferably within about the first 180° of arc from the 0° radius, and then increases to a maximum preferably within about the last 90° of arc or in the region from about 270 to about 360° of arc from the 0° radius. To obtain the desired linear motion generally parallel to the reference plane, the radius of the second radial cam surface, starting at the radius at the start of its cycle of operation, its 0° radius, which is at a minimum, and proceeding against the normal direction of rotation of the first radial cam surface, remains at the minimum for the degrees of arc needed for the decrease in radius of the first cam surface to become sufficient for the projection of the tape rake means to completely withdraw from a perforation or the reference plane. Thereafter, it gradually increases to a maximum at an arc at most equivalent to the arc of that radius of the first cam surface whereat the projection of the tape rake means is about to enter a tape perforation or the face is in a plane which intersects the plane of the 0° radius of the second cam surface. The maximum radius is maintained for at least the arc needed for the projection of the tape rake means to seat in a tape perforation, preferably about 135°, and then it decreases to the maximum radius. The 0° radius of the second radial cam surface is in a plane which intersects the plane of the 0° radius of the first radial cam surface at an included angle substantially equal to the included angle between the plane of the first cam follower surface and the plane of the second cam follower surface. Preferably, the first radial cam surface is rotated in the same direction as the second radial cam surface, although in less preferred embodiments of the apparatus of this invention they rotate in opposite directions.

The means for establishing and maintaining the cam follower means in cam following contact with the radial cam means comprise spring means which urge the first and second leg means into abutment with the first and second radial cam surfaces, respectively.

This general structure is present in each of the specific embodiments illustrated in the drawings.

*Structure*

Figure 2:
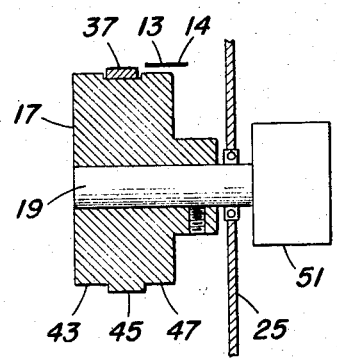
FIG. 2 is a partly diagrammatic sectional view of the apparatus of FIG. 1, which view has been taken as indicated by the sectioning plane 2—2 in FIG. 1.
Figure 3:
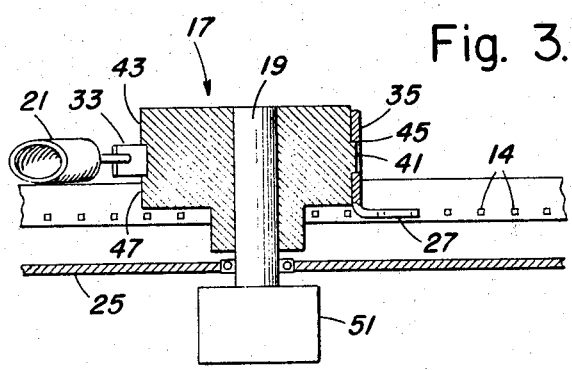
FIG. 3 is another partly diagrammatic sectional view of the apparatus of FIG. 1, which view has been taken as indicated by the sectioning plane 3—3 in FIG. 1.
Figure 4:
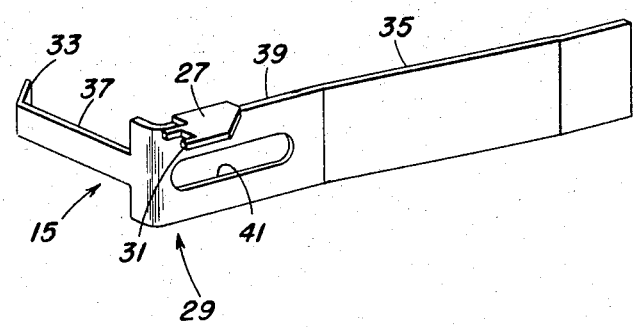
FIG. 4 is a perspective view of the cam follower rake member employed in the apparatus of FIG. 1.
Figure 5:
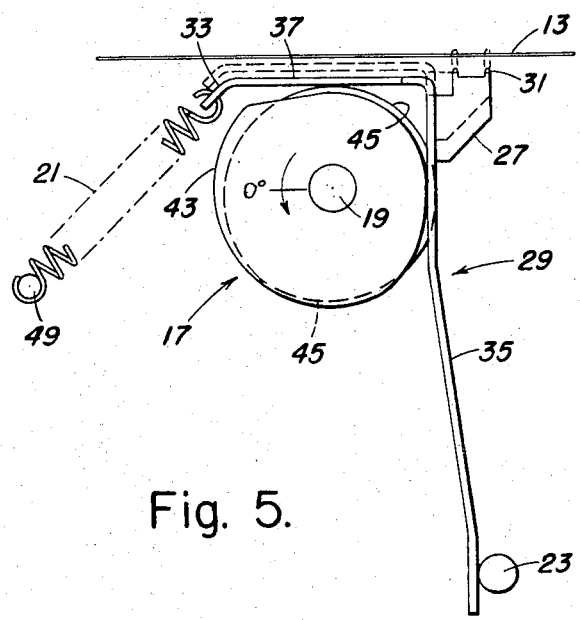
FIG. 5 is a plan view of the apparatus of FIG. 1 showing the relative positions of various parts of the apparatus after completion of about one-fourth of a cycle of operation.
Figure 6:
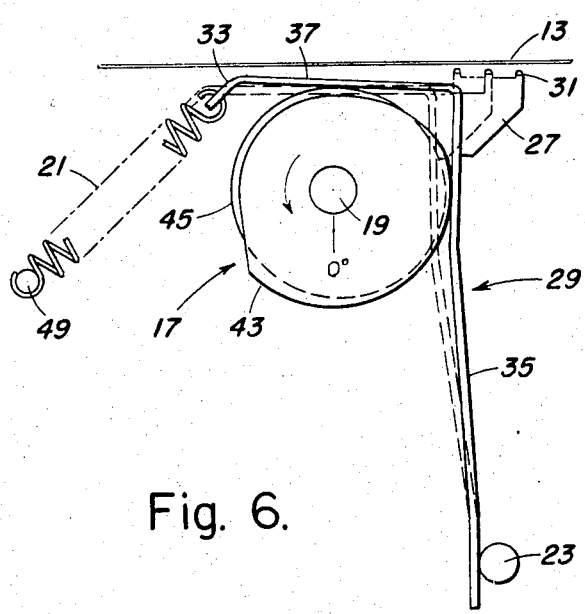
FIG. 6 is another plan view of the apparatus of FIG. 1 showing the relative positions of parts of the apparatus after completion of about one-half of a cycle of operation.
Figure 7:
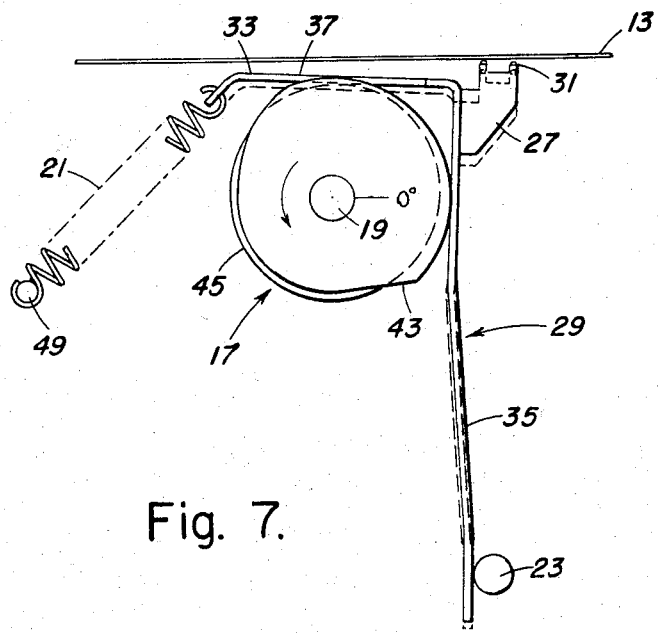
FIG. 7 is still another plan view of the apparatus of FIG. 1 showing relative positions of parts of the apparatus after completion of about three-fourths of the cycle of operation.

In greater detail, FIGS. 1–8 disclose a specific apparatus 11 particularly useful in a movie projector for intermittently advancing along a predetermined linear path a film 13 having perforations 14 (see FIG. 3). The apparatus comprises a cam follower rake member 15, a compound cam 17, a rotatable drive shaft 19, a spiral tension spring 21, a retainer pin 23 and a support structure 25.

The cam follower rake member 15 comprises a rake 27 and cam follower 29.

The rake 27 comprises projections or teeth 31 which are generally positioned in the same plane, which plane is longitudinally and perpendicularly disposed relative to the reference plane. The rake 27 is joined to the cam follower 29.

The cam follower 29 comprises a first leg 33 and a second leg 35. The first leg is generally parallel to the reference plane while the second leg 35 is transversely positioned relative to the first leg and the reference plane. In the embodiment shown the angle between the two legs is about 90°, although greater and lesser angles are within the broader concepts of this invention, and the first leg 33 is joined to the second leg 35. The first leg 33 has a transversely (relative to the leg) narrow, longitudinally (relative to the leg) extending cam follower portion 37. The second leg 35 has a cam follower portion 39 interrupted by a transversely (relative to the leg) narrow, longitudinally (relative to the leg) extending slot 41 which preferably is spaced substantially equidistantly from the lateral sides of the second leg 35.

The compound cam 17 is disposed on an axis of rotation between the first and second legs 33 and 35 of the cam follower 29 and in a plane generally parallel to the reference plane. It comprises three radial cam sections 43, 45 and 47. The center radial cam section 45 provides a radial cam surface for the first leg 33 of the cam follower 29, while the two radial cam sections 43 and 47 on each side of the center radial cam section 45 provides substantially identical radial cam surfaces for the second leg 35 of the cam follower 29. Accordingly, the compound cam 17 is positioned so that the radial cam surface of the center radial cam section 45 touches the cam follower portion 37 of the first leg 33, while the radial cam surfaces provided by the radial cam sections 43 and 47 contact the cam follower portion 39 of the second leg 35 with the slot 41 in the cam follower portion 39 being in alinement with the center radial cam section 45. Because a purpose of the slot 41 is to minimize contact of the second leg 35 with the center radial cam section 45, the slot 41 preferably has sufficient longitudinal (relative to the leg 35) length and transverse (relative to the leg 35) width to prevent such contact from normally occurring.

In FIGS. 1 and 5–8 the "0°" legend denotes the 0° position of the compound cam 17 as well as the 0° radius position of the lateral or outer radial cam sections 43 and 47.

In the embodiment shown the center radial cam section 45 of the compound cam 17 has a radial cam surface which, starting at its 0° radius and going contrary to the normal direction of rotation of the compound cam 17, preferably decreases to a minimum radius at 90°, remains at this minimum radius from about 90° to about 180°, increases to a maximum radius at about 270° and then decreases through the 0° radius to the minimum at about 90°. The difference between the maximum radius and the minimum radius is at least equal to the minimum distance transverse to the reference plane which the projections 31 of the rake 27 must move from their positions when seated in tape perforations 13 to their positions where they are just withdrawn from the perforations 13.

In the embodiment shown, the lateral radial cam sections 43 and 47 of the compound cam 17 have substantially identical radial cam surfaces which, starting at their 0° radius positions, which are substantially in the same plane through the axis of rotation and in this embodiment about 90° behind the axial plane of the 0° radius of the center radial cam section 45, preferably are at a minimum radius from about 0° to about 90°, increase to a maximum radius at about 180°, remain at the maximum radius from about 180° to about 315° and then decrease rapidly to the minimum radius at about 0°. The difference between the maximum radius and the minimum radius of each lateral radial cam surface is substantially equal to the distance parallel to the reference plane which the projections 31 of the rake 27 must travel to move the film 12 longitudinally by one frame.

The compound cam 17 is secured to a rotatable drive shaft 19 rotatably carried by the support structure 25 and coupled to a rotatable shaft drive unit 51 (see FIGS. 2 and 3).

The spiral tension spring 21 and retainer pin 23 establish and maintain the cam follower portions 37 and 39 of the cam follower 29 in contact with the radial cam surfaces of the compound cam 17. One end of the spring 21 is secured to the outer end of the first leg 33 and the other end of the spring 21 is secured to a lug member 49 of the support structure 25. The longitudinal axis of the spiral tension spring 21 is at about a 45° angle to the reference plane in order to bias the cam follower 29 not only parallel to the reference plane, but also transversely to the reference plane. The retainer pin 23 is secured to the support structure 25 at a position to bear against the outer side of the second leg 35 of the cam follower 29, the compound cam 17 being on the inner side of the second leg 35. The retainer pin 23 serves as a fulcrum for the cam follower 29. The second leg 35 is of sufficient length and the retainer pin 23 is stationed sufficiently close to the reference plane that the cam follower 29 can move transversely to the reference plane in a cycle of operation without the second leg escaping the retainer pin 23. At the same time, the retainer pin 23 is stationed sufficiently far from the reference plane and the second leg 35 is sufficiently limber that the cam follower 29 in a cycle of operation can move back and forth parallel to the reference plane by at least the longitudinal dimension of a frame of the film 12.

Operation

Under normal operative conditions, the rotatable drive shaft 19 turns the compound cam 17 in a selected direction which is counterclockwise in FIGS. 1 and 5–8. Starting at the beginning of a cycle of operation, as in FIG. 1, as the cam 17 turns from its 0° position toward its 90° position, as in FIG. 5, action of the spring 21 and the center radial cam section 45 in combination with the cam follower portion 37 of the first leg 33 causes the projections 31 to unseat or move out of the film perforations 14. As the compound cam 17 rotates from its 90° position toward its 180° position shown in FIG. 6, the crown portions of the outer radial cam sections 43 and 47 in combination with the cam follower portion 39 of the second leg 35 move the claw member 27 oppositely to the direction of film travel and to a position whereat the claw projections 31 are in alinement with film perforations 14. As the compound cam 17 continues its rotation from its 180° position to its 270° position, the center radial cam section 45 in combination with the cam follower portion 37 of the first leg 33 thrusts the rake 27 toward the film 13. As the cam 17 approaches its 315° position the projections 31 seat in film perforations 14 as in FIG. 8 and, as the compound cam 17 rotates from its 315° position to its 0° position, and the crown or peak portions of the outer radial cam sections 43 and 47 pass the cam follower portion 39 of the second leg 35, the spring 21 pulls the first leg 33 in the direction of film travel and the rake 27 impels the film 13 forwardly rapidly in the direction of travel. This places the cam 17 at about the 0° position shown in FIG. 1, and the cycle of operation is repeated.

Other specific embodiment

The specific apparatus 61 of FIG. 9 has substantially the same structure as the specific apparatus 11 of FIGS. 1–8, except that the outer end of the second leg 35 is secured to one end of a flexible spring leaf 63, the other end of which is secured to a lug member 65 of the support structure 25. The flexible spring leaf 63 is positioned generally parallel to the reference plane and is sufficiently flexible to permit movement of the second leg 35 according to the cam and spring actions which occur under normal operative conditions.

Thus, there is provided an intermittent film advancement apparatus.

A feature of advantage of this apparatus is the simplicity of its structure and operation.

Still another feature of advantage resides in the inherent ruggedness of the parts.

What is claimed is:

1. Perforated tape advancing apparatus comprising an approximately L-shaped rake member having two legs substantially rigid with respect to each other and at approximately a right angle to each other, a compound cam rotating in the angle between said two legs, spring means urging both legs of said rake member into contact with said compound cam, and a claw portion on said rake member near the junction of the two legs thereof and in positions to engage perforations in the tape which is to be advanced, said compound cam being shaped to move said rake member to shift said claw portion parallel to said tape while out of contact therewith and then into contact with the tape to engage the perforations thereof and then to maintain said claw portion in engagement with said perforations while said spring means advances said rake member and claw portion.

2. A construction as defined in claim 1, wherein said spring means is a tension spring pulling obliquely on a free end of a first leg of said rake member.

3. A construction as defined in claim 1, further including retainer means engaging a second leg of said rake member near the end thereof remote from the first leg.

4. A construction as defined in claim 3, wherein said retainer means is a stationary abutment against which said second leg may slide.

5. A construction as defined in claim 3, wherein said retainer means is a leaf spring fastened to said second leg and extending at an angle thereto and shaped to allow said second leg to move in the direction of the length of the second leg.

References Cited

UNITED STATES PATENTS

| | | | |
|---|---|---|---|
| 2,587,548 | 2/1952 | Thevenaz | 226—71 |
| 2,611,292 | 9/1952 | Chandler | 226—71 |

M. HENSON WOOD, JR., *Primary Examiner.*

RICHARD A. SCHACHER, *Assistant Examiner.*

PO-1050
(5/69)

UNITED STATES PATENT OFFICE
CERTIFICATE OF CORRECTION

Patent No. 3,441,186　　　　　Dated April 29, 1969

Inventor(s)　Paul J. Good

It is certified that error appears in the above-identified patent and that said Letters Patent are hereby corrected as shown below:

Column 3, line 24, delete the entire line and substitute --reference plane, and preferably at about $180°$ from the $0°$--. Lines 28-29, delete "maximum" and substitute --minimum--.

Column 6, line 23 (being line 9 of claim 1) delete "positions" and substitute --position--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents